US012811373B2

(12) United States Patent
Miyazaki et al.

(10) Patent No.: US 12,811,373 B2
(45) Date of Patent: Nov. 24, 2026

(54) ELECTRIC JUNCTION BOX HAVING COVER WITHIN WHICH ELECTRIC WIRES CAN BE MOUNTED

(71) Applicant: YAZAKI CORPORATION, Tokyo (JP)

(72) Inventors: Yoshiya Miyazaki, Makinohara (JP); Hirotaka Kurita, Makinohara (JP); Nobutaka Kaneko, Makinohara (JP); Tomohiro Nagata, Makinohara (JP); Ginga Tanaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 574 days.

(21) Appl. No.: 18/451,765

(22) Filed: Aug. 17, 2023

(65) Prior Publication Data

US 2024/0097411 A1 Mar. 21, 2024

(30) Foreign Application Priority Data

Sep. 21, 2022 (JP) ................................. 2022-150480

(51) Int. Cl.
*H02B 1/46* (2006.01)
*H01R 9/24* (2006.01)

(52) U.S. Cl.
CPC ............. *H02B 1/46* (2013.01); *H01R 9/2416* (2013.01)

(58) Field of Classification Search
CPC .................... H02B 1/46; H01R 9/2416; H01R 9/2475–4/34; B60R 16/0238
See application file for complete search history.

(56) References Cited

U.S. PATENT DOCUMENTS

| | | | | |
|---|---|---|---|---|
| 10,686,261 | B2 * | 6/2020 | Matsuura | H02G 3/16 |
| 2001/0027063 | A1 | 10/2001 | Wakata et al. | |
| 2014/0154897 | A1 | 6/2014 | Makino et al. | |
| 2021/0170963 | A1 * | 6/2021 | Tashiro | B60R 16/0239 |

FOREIGN PATENT DOCUMENTS

| | | | |
|---|---|---|---|
| AU | 7227500 | A | 6/2001 |
| CN | 103855661 | A | 6/2014 |
| CN | 208284951 | U | 12/2018 |
| JP | 2001-266967 | A | 9/2001 |
| JP | 2007-189864 | A | 7/2007 |
| JP | 2021-44141 | A | 3/2021 |

* cited by examiner

*Primary Examiner* — Abdullah A Riyami

(74) *Attorney, Agent, or Firm* — KENEALY VAIDYA LLP

(57) ABSTRACT

There is provided an electric junction box unit including: an electric junction box having a plurality of stud bolts; a plurality of electric wire with terminals each including a terminal and an electric wire and fastened to a corresponding one of the plurality of stud bolts; and a cover to which at least one of the plurality of electric wire with terminals is assembled. The electric junction box includes an interference portion that interferes with at least a part of the cover when the electric wire with terminals assembled to the cover are disposed at a position different from a normal position where one of the electric wire with terminals is fastened to the corresponding stud bolt.

3 Claims, 11 Drawing Sheets

ELECTRIC JUNCTION BOX HAVING COVER WITHIN WHICH ELECTRIC WIRES CAN BE MOUNTED

CROSS-REFERENCE TO RELATED APPLICATIONS

This application is based on and claims priority under 35 USC 119 from Japanese Patent Application No. 2022-150480 filed on Sep. 21, 2022, the contents of which are incorporated herein by reference.

TECHNICAL FIELD

The present disclosure relates to an electric junction box unit.

BACKGROUND ART

In the related art, there has been proposed an electric junction box that is mounted on a vehicle and accommodates various electronic components such as a fuse, a relay, and an electronic control unit in an accommodation space.

One of the electric junction boxes of the related art includes, for example, a plurality of stud bolts electrically connected to electronic components accommodated therein, and is configured such that an external device and the electronic component are electrically connected to each other by fastening corresponding electric wires with a terminal connected to the external device to the plurality of stud bolts (for example, see JP2021-044141A).

When an electric wire with a terminal that does not correspond to one stud bolt is fastened, the electric junction box (such as a fuse box or a relay box) may not function as an original function.

In addition, when there is an unused stud bolt among the plurality of stud bolts, even if the electric wire with a terminal is fastened to the unused stud bolt, the electric junction box (the fuse box, the relay box, or the like) may not function as an original function. Therefore, the electric junction box (electric junction box unit) is preferably configured such that the electric wire with a terminal is not fastened to a stud bolt different from the corresponding stud bolt as described above.

SUMMARY OF INVENTION

The present disclosure provides an electric junction box unit that prevents an erroneous assembly of an electric wire with a terminal to a stud bolt.

According to an illustrative aspect of the present disclosure, an electric junction box unit includes: an electric junction box having a plurality of stud bolts; a plurality of electric wire with terminals each including a terminal and an electric wire and fastened to a corresponding one of the plurality of stud bolts; and a cover to which at least one of the plurality of electric wire with terminals is assembled. The electric junction box includes an interference portion that interferes with at least a part of the cover when the electric wire with terminals assembled to the cover are disposed at a position different from a normal position where one of the electric wire with terminals is fastened to the corresponding stud bolt.

The present disclosure has been briefly described above. Further, details of the present disclosure will be further clarified by reading modes (hereinafter referred to as "embodiments") for carrying out the disclosure described below with reference to the accompanying drawings.

DESCRIPTION OF EMBODIMENTS

Embodiment

Hereinafter, an embodiment of the present disclosure will be described with reference to the drawings. An electric junction box unit 100 includes an electric junction box 1 in which stud bolts S are provided in an internal space, electric wires 50 with a terminal fastened to the stud bolts S, and an inner cover 60 (corresponding to a "cover" of the present disclosure) which is disposed between the electric junction box 1 and the electric wires 50 with a terminal and to which the electric wires 50 with a terminal are assembled.

Hereinafter, for convenience of description, as illustrated in FIGS. 1 to 11, "front", "rear", "left", "right", "upper", and "lower" are defined. A "front-rear direction", a "left-right direction", and an "upper-lower direction" are orthogonal to each other.

Electric Junction Box 1

Hereinafter, an outline of the electric junction box 1 will be described. The electric junction box 1 is typically a relay box that is mounted on a vehicle and has an internal space that accommodates electronic components such as relays and electronic components R that are other components.

Figure 1:
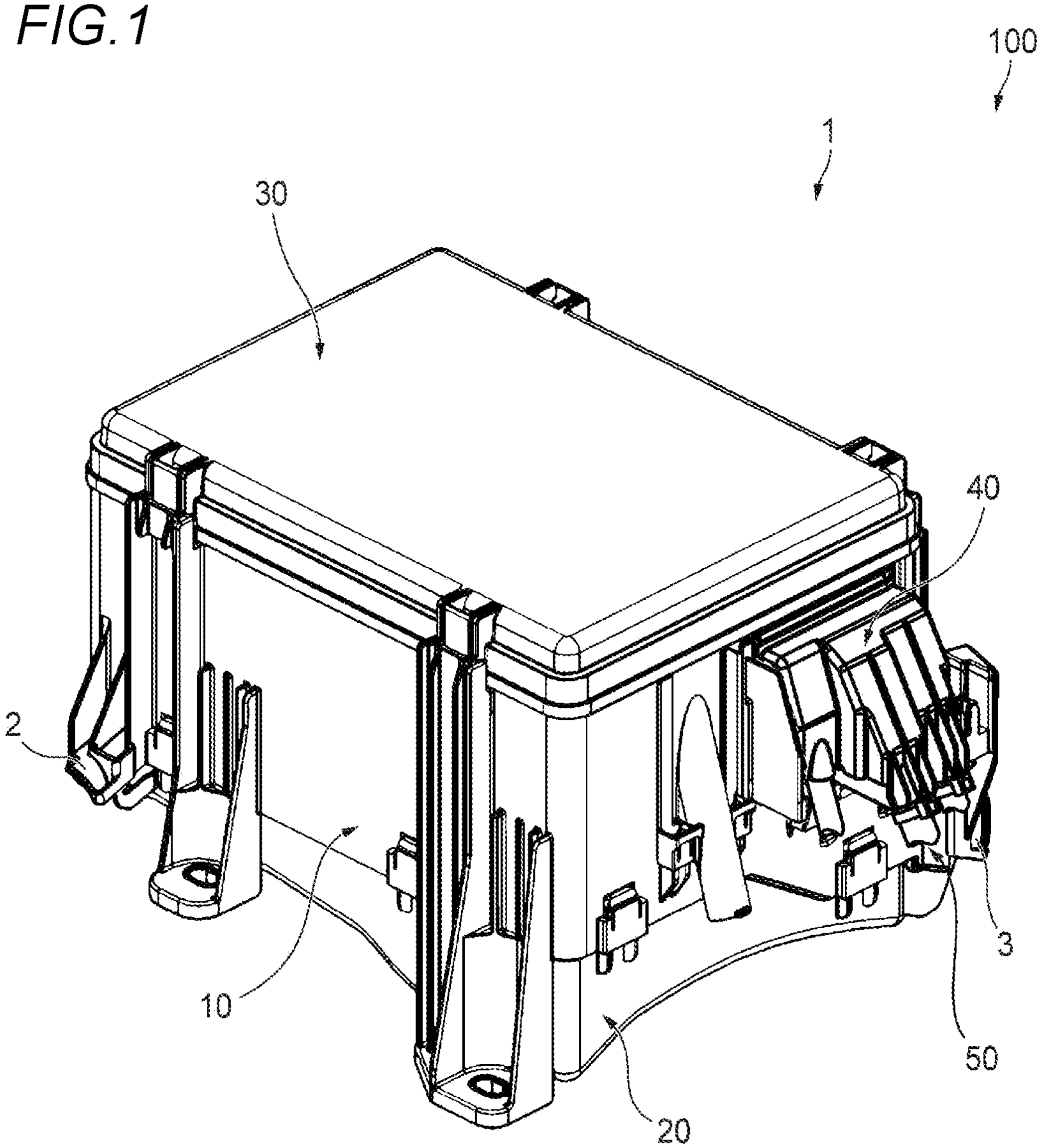
FIG. 1 is a front perspective view of an electric junction box unit according to an embodiment of the present disclosure.
Figure 1:
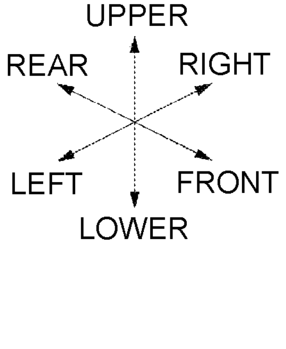
Figure 2:
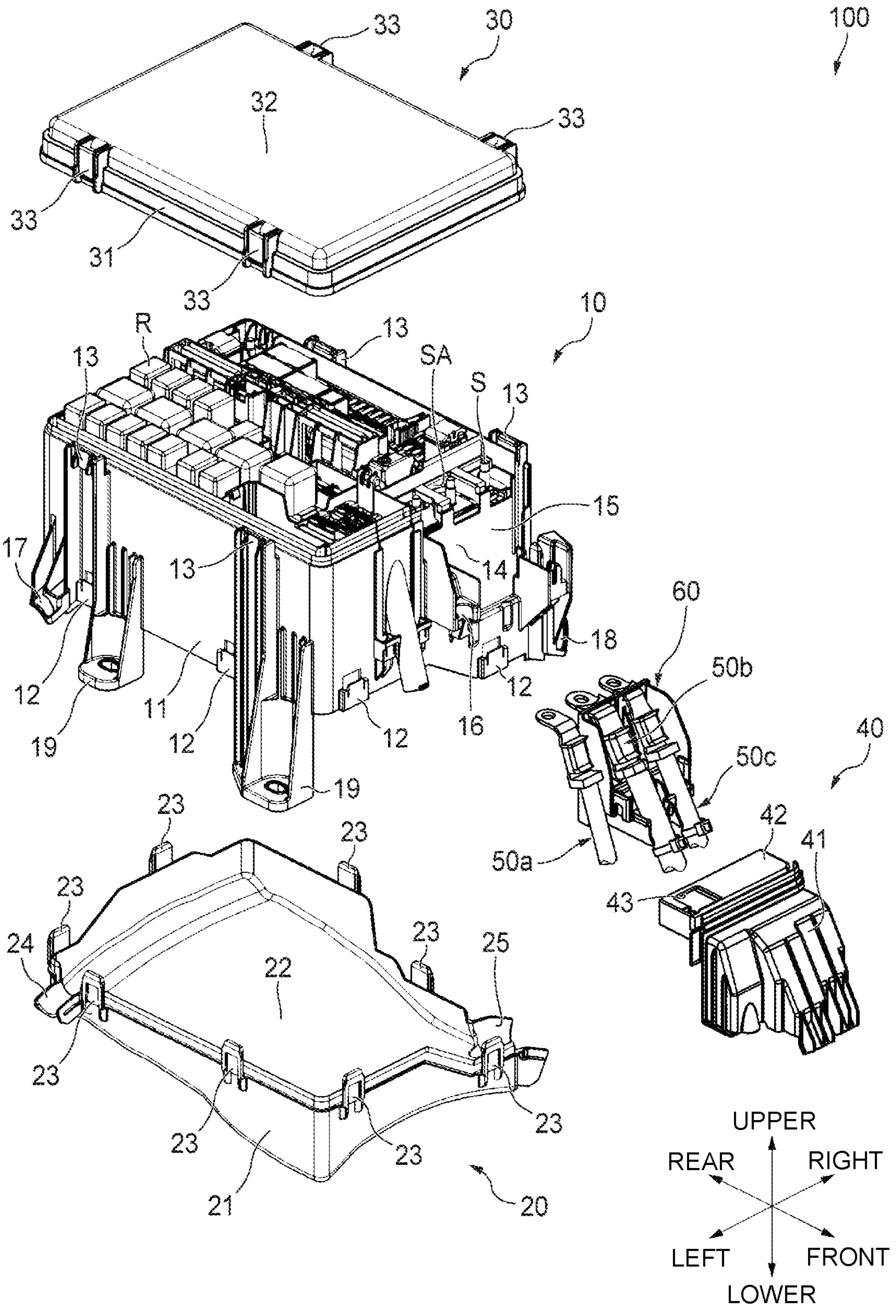
FIG. 2 is an exploded view of a main part in FIG. 1.

As illustrated in FIGS. 1 and 2, the electric junction box 1 includes a frame 10, a lower cover 20 assembled below the frame 10 so as to close a lower end opening of the frame 10, an upper cover 30 assembled above the frame 10 so as to close an upper end opening of the frame 10, and a side cover 40 assembled to a side wall portion 11 (side cover assembling portion 14) of the frame 10. All of the four components included in the electric junction box 1 are resin molded bodies.

Figure 6:
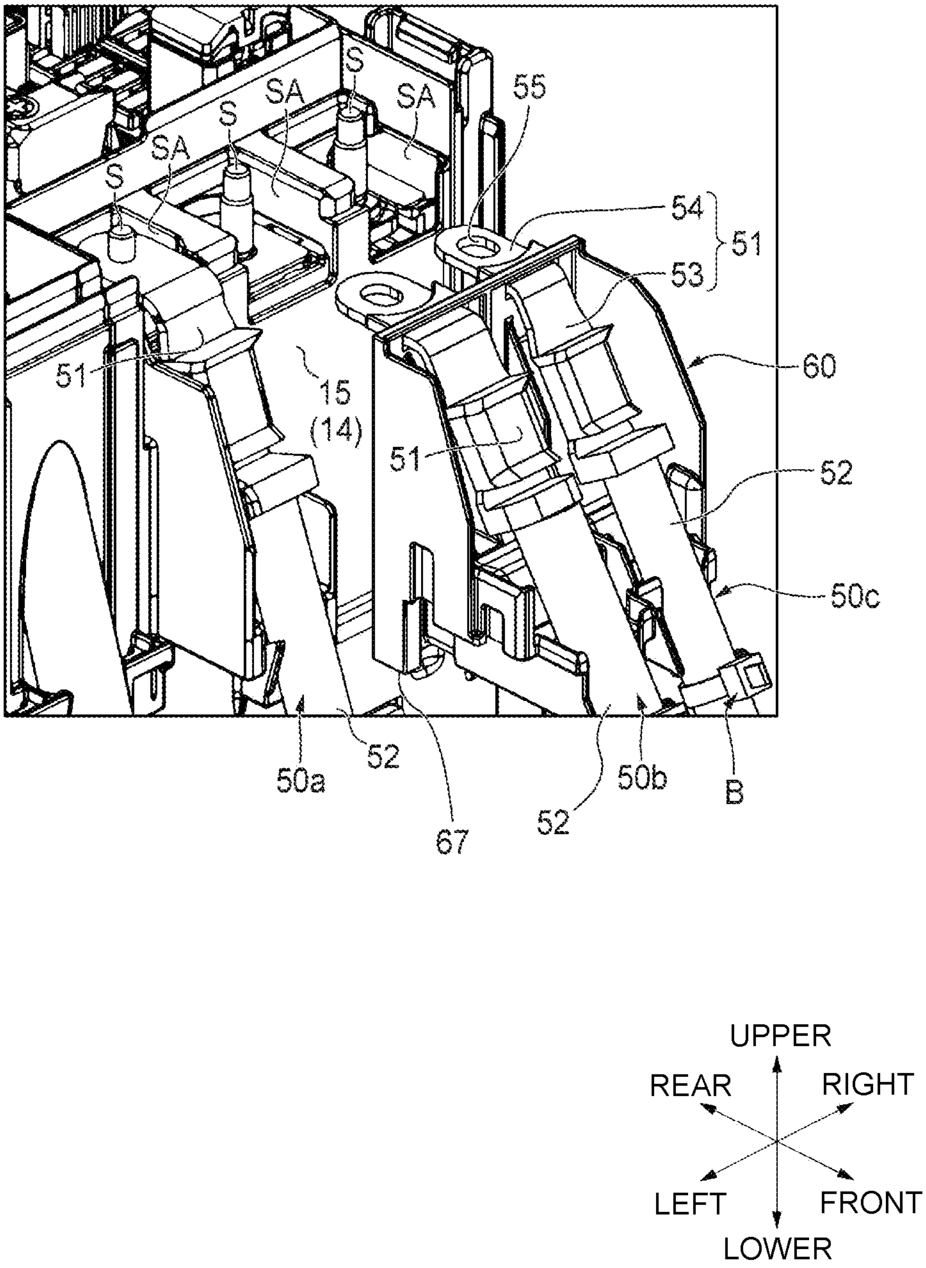
FIG. 6 is a first view illustrating an erroneous assembly prevention structure of an electric wire with a terminal.
Figure 7:
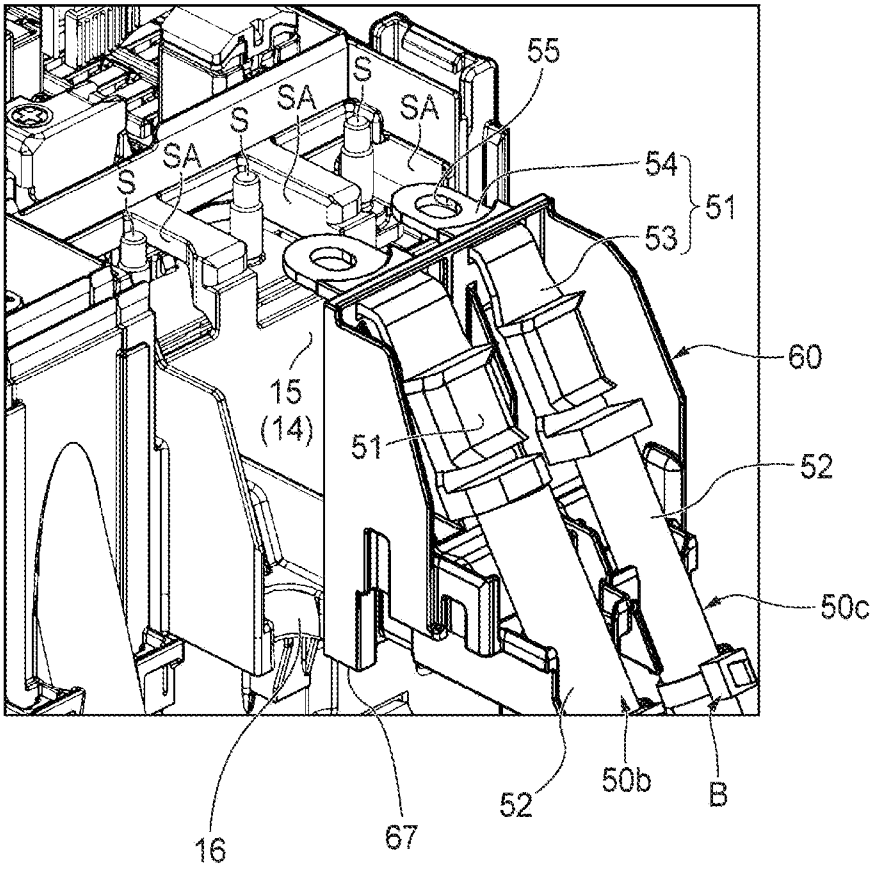
FIG. 7 is a second view illustrating the erroneous assembly prevention structure of the electric wire with a terminal.
Figure 7:
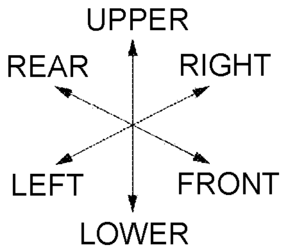
Figure 8:
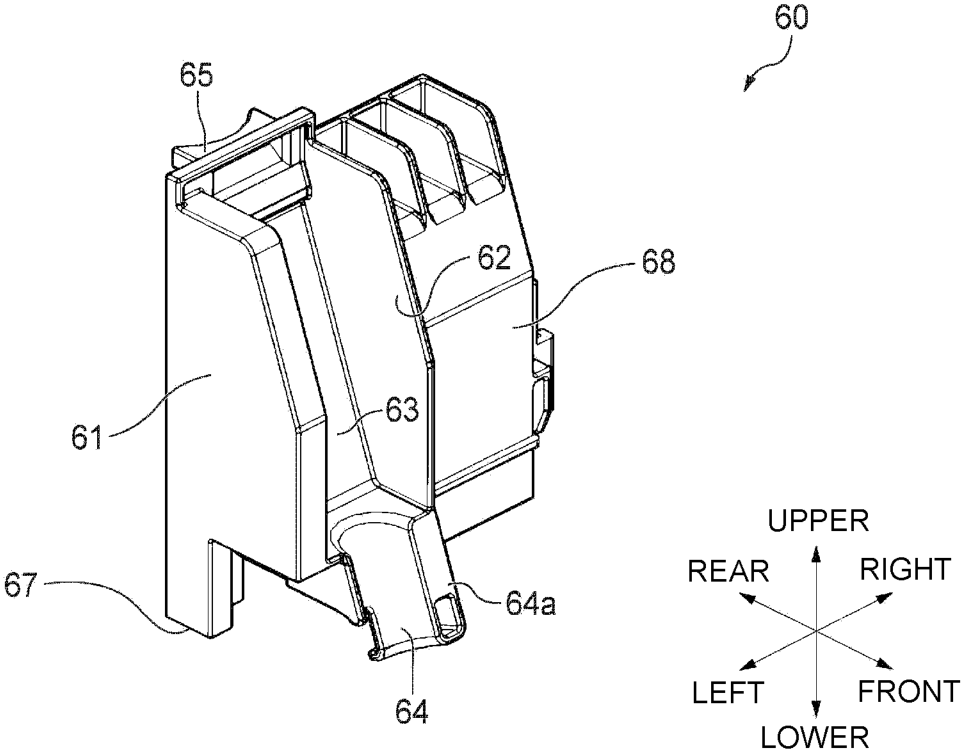
FIG. 8 is a front perspective view illustrating a first modification of the inner cover.
Figure 9:
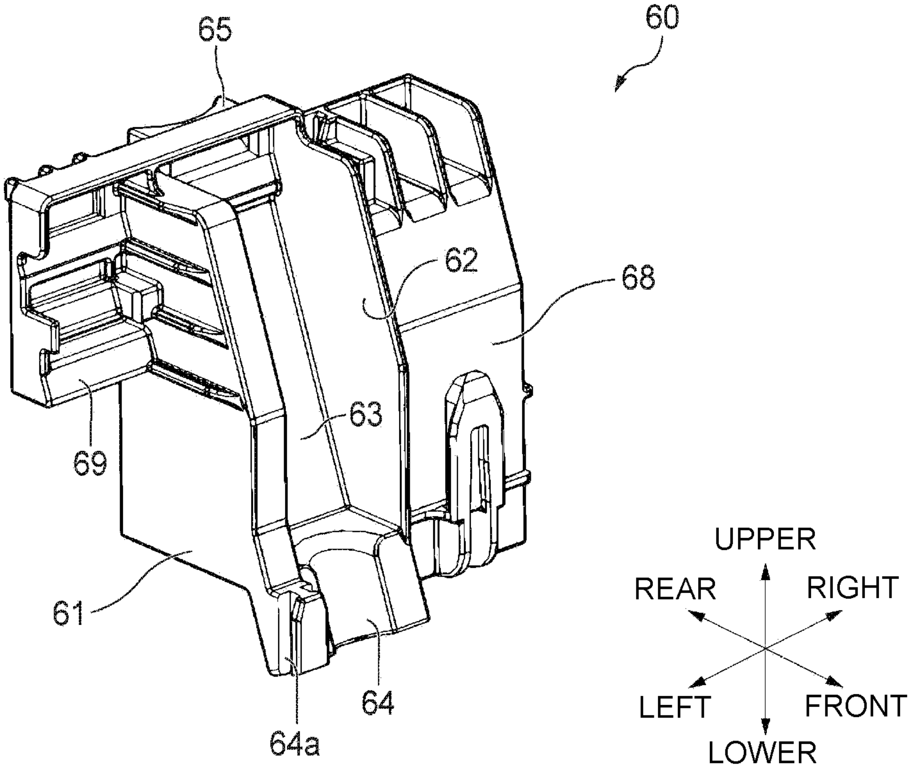
FIG. 9 is a front perspective view illustrating a second modification of the inner cover.
Figure 10:
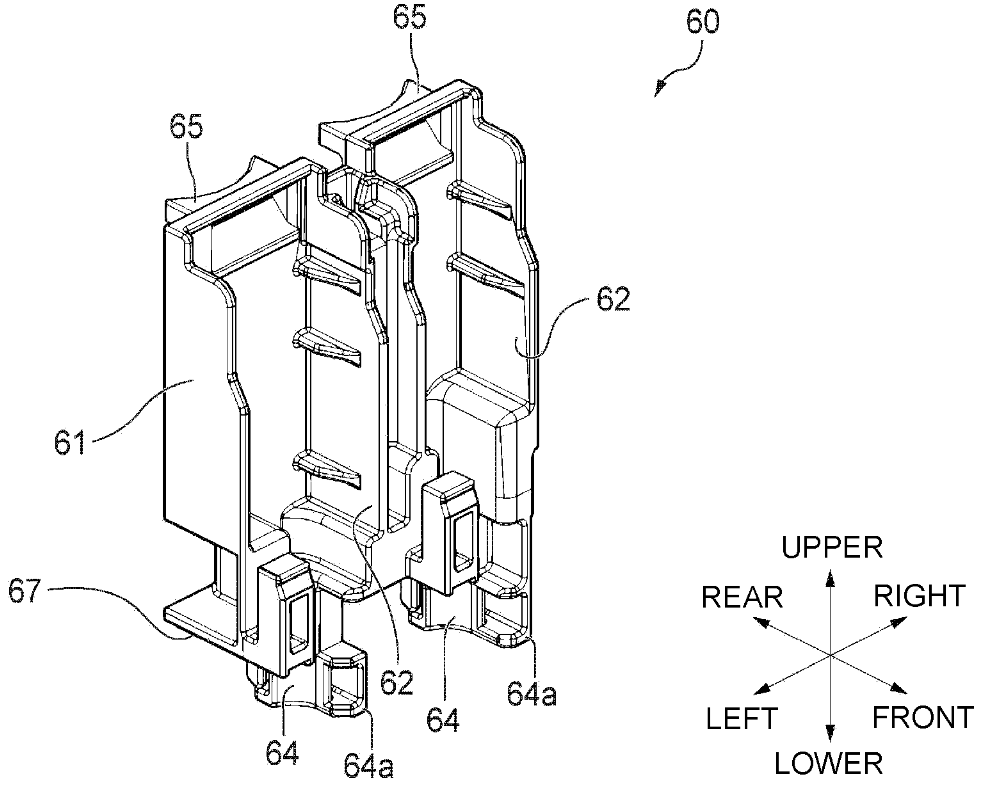
FIG. 10 is a front perspective view illustrating a third modification of the inner cover.
Figure 11:
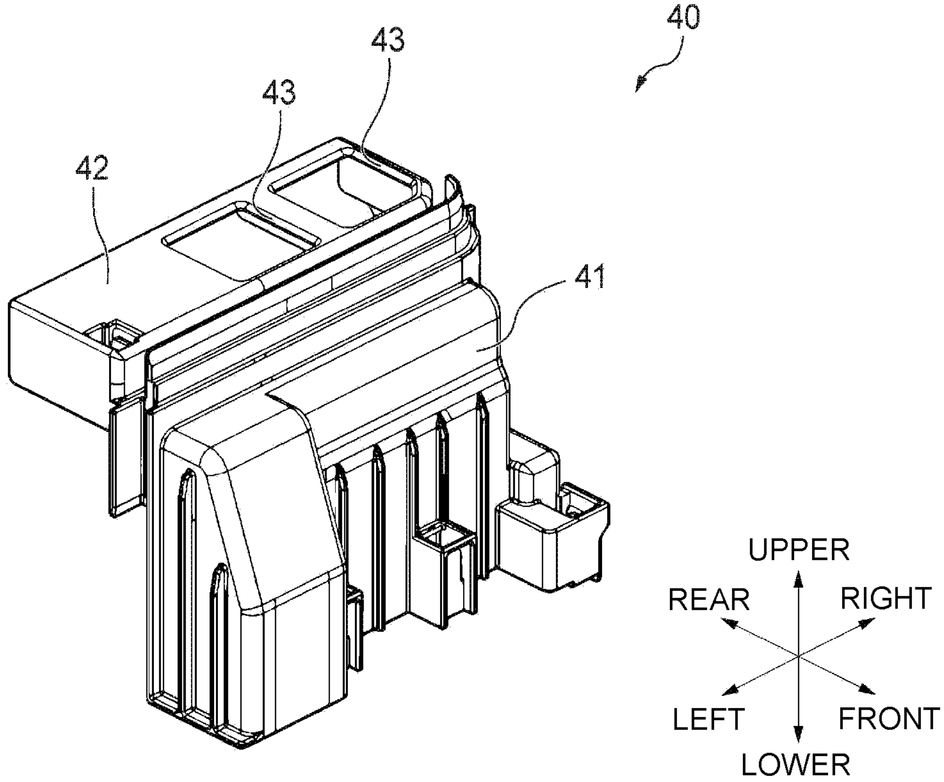
FIG. 11 is a front perspective view illustrating a first modification of the side cover corresponding to the inner cover illustrated in FIG. 10.

A plurality of (three in this example) bolt accommodating portions SA are arranged side by side in the left-right direction in a front right portion of the internal space of the electric junction box 1 (see FIGS. 2 and 6 to 7). The stud bolt S is provided in each of the plurality of bolt accommodating portions SA (see FIGS. 2 and 6 to 7). The stud bolt S is connected to an electronic component R or the like mounted in the electric junction box 1 in an internal space via a bus bar (reference numeral is omitted), and the electric wire 50 with a terminal connected to an external device (not illustrated) such as a battery is fastened to the stud bolt S, so that the electronic component R and the external device can be electrically connected.

In the electric junction box 1, as illustrated in FIG. 1, an electric wire (not illustrated) electrically connected to a part of the electronic component R positioned inside the electric junction box 1 is led out to the outside of the electric junction box 1 through an electric wire lead-out hole 2 provided in a rear left portion of the electric junction box 1. Further, an electric wire (not illustrated) electrically connected to a part of the other electronic component R is led out to the outside of the electric junction box 1 through an electric wire lead-out hole 3 provided in a right front portion of the electric junction box 1.

Hereinafter, the frame 10, the lower cover 20, the upper cover 30, and the side cover 40 that are included in the electric junction box 1 will be described in this order.

First, the frame 10 will be described. As illustrated in FIG. 2, the frame 10 includes a substantially rectangular cylindrical side wall portion 11 extending in the upper-lower direction. The side wall portion 11 constitutes most of the external appearance of a side surface of the electric junction box 1.

Locked portions 12 each including a through hole extending in the upper-lower direction are integrally provided on outer surfaces at a plurality of (eight in this example) portions of a lower end portion of the side wall portion 11 in a peripheral direction. The locked portion 12 has a function of assembling the lower cover 20 to the frame 10.

Locked portions 13 are integrally provided on outer surfaces at a plurality of (four in this example) portions of an upper end portion of the side wall portion 11 in the peripheral direction. The locked portion 13 has a function of assembling the upper cover 30 to the frame 10.

The side cover assembling portion 14 to which the side cover 40 is assembled is provided at a position corresponding to the plurality of stud bolts S on the front right portion of the side wall portion 11. The side cover assembling portion 14 is provided with, for example, a locked portion (not illustrated) to which a locking portion (not illustrated) of the side cover 40 is locked. The locked portion has a function of assembling the side cover 40 to the frame 10.

Portions of the side cover assembling portion 14 corresponding to the right and central stud bolts S (specifically, the front right portion of the side wall portion 11) function as an inner cover assembling portion 15 to which the inner cover 60 is assembled. A locking piece (reference numeral is omitted) to which a locked portion 66 of the inner cover 60 is locked is provided at a right end portion of the inner cover assembling portion 15. The locking piece has a function of assembling the inner cover 60 to the frame 10.

A length of the side cover assembling portion 14 in the left-right direction corresponds to a length from a right end portion of the right bolt accommodating portion SA to a left end portion of the left bolt accommodating portion SA. That is, the inner cover assembling portion 15 corresponds to the length from the right end portion of the right bolt accommodating portion SA to a left end portion of the central bolt accommodating portion SA.

At a portion of the side cover assembling portion 14 corresponding to the left stud bolt S (specifically, the front right portion of the side wall portion 11), a semi-cylindrical electric wire holding portion 16 that opens forward is integrally provided in a substantially central area in the upper-lower direction so as to extend downward (see also FIGS. 6 and 7). The electric wire holding portion 16 has a function of holding a part of an electric wire 52 in an electric wire 50*a* with a terminal (corresponding to “another electric wire with a terminal” of the present disclosure) fastened to the left stud bolt S. Accordingly, the electric wire 52 held by the electric wire holding portion 16 is led out downward from the side cover 40 (see FIG. 1). Further, the electric wire holding portion 16 corresponds to an “interference portion” of the present disclosure. Details of the function of the electric wire holding portion 16 as the interference portion will be described later.

A semi-cylindrical gutter-shaped portion 17 that opens downward is provided to extend leftward at a position corresponding to the electric wire lead-out hole 2 in the rear left portion of the side wall portion 11. The gutter-shaped portion 17 has a function of constituting an upper portion of an inner wall defining the electric wire lead-out hole 2 in the rear left portion.

A semi-cylindrical gutter-shaped portion 18 that opens downward is provided to extend rightward at a position corresponding to the electric wire lead-out hole 3 in the right front portion of the side wall portion 11. The gutter-shaped portion 18 has a function of constituting an upper portion of an inner wall defining the electric wire lead-out hole 3 in the right front portion.

A stay portion 19 extending downward is integrally provided on an outer surface at each of a plurality of portions of the lower end portion of the side wall portion 11 in the peripheral direction. The stay portion 19 has a function of fixing the frame 10 (that is, the electric junction box 1) to a mounting portion of the vehicle by assembling a tip end portion thereof to the mounting portion of the vehicle.

Next, the lower cover 20 will be described. As illustrated in FIG. 2, the lower cover 20 integrally includes an annular side wall portion 21 constituting most of the external appearance of a lower side surface of the electric junction box 1, and a bottom wall portion 22 closing an annular lower end opening of the side wall portion 21 and constituting most of the external appearance of a bottom surface of the electric junction box 1. An annular upper end edge portion of the side wall portion 21 has a shape corresponding to an annular lower end edge portion of the side wall portion 11 of the frame 10, and can be fitted to the annular lower end edge portion of the side wall portion 11.

Locking pieces 23 extending upward are integrally provided on outer surfaces at a plurality of (eight in this example) portions of the upper end portion of the side wall portion 21 in the peripheral direction so as to correspond to the plurality of locked portions 12 of the frame 10.

A semi-cylindrical gutter-shaped portion 24 that opens upward is provided to extend leftward at a position corresponding to the electric wire lead-out hole 2 in the rear left portion of the side wall portion 21. The gutter-shaped portion 24 has a function of constituting a lower portion of an inner wall defining the electric wire lead-out hole 2 in the rear left portion.

A semi-cylindrical gutter-shaped portion 25 that opens upward is provided to extend rightward at a position corresponding to the electric wire lead-out hole 3 in the right front portion of the side wall portion 21. The gutter-shaped portion 24 has a function of constituting a lower portion of an inner wall defining the electric wire lead-out hole 3 in the right front portion.

Next, the upper cover 30 will be described. As illustrated in FIG. 2, the upper cover 30 integrally includes an annular side wall portion 31 constituting most of the external appearance of an upper side surface of the electric junction box 1, and an upper wall portion 32 closing the annular upper end opening of the side wall portion 31 and constituting most of the external appearance of the upper surface of the electric junction box 1. An annular lower end edge portion of the side wall portion 31 has a shape corresponding to an annular upper end edge portion of the side wall portion 11 of the frame 10, and can be fitted to the annular upper end edge portion of the side wall portion 11.

Locking portions 33 including hole portions penetrating in the upper-lower direction are integrally provided on outer surfaces at a plurality of (four in this example) portions of the lower end portion of the side wall portion 31 in the peripheral direction so as to correspond to the plurality of locked portions 13 of the frame 10.

Figure 3:
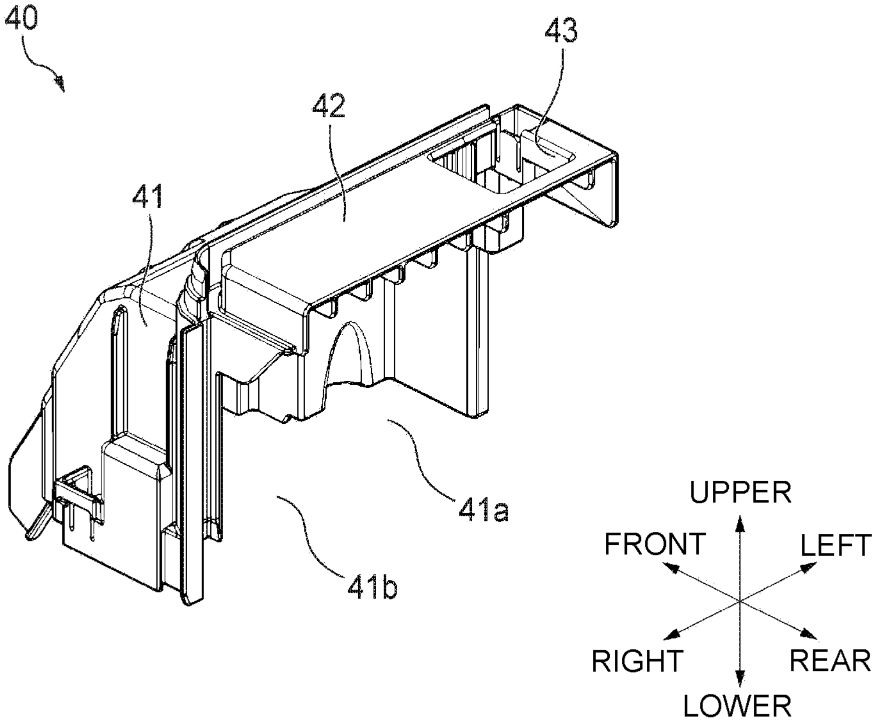
FIG. 3 is a rear perspective view of a side cover illustrated in FIG. 2.

Next, the side cover 40 will be described. As illustrated in FIGS. 2 and 3, in the side cover 40, a main body portion 41 that opens forward and penetrates in the upper-lower direction and an upper wall portion 42 that closes an upper opening of the main body portion 41 are integrally configured.

The main body portion 41 includes a first accommodating portion 41*a* that accommodates the electric wire 50*a* with a terminal, and a second accommodating portion 41*b* that accommodates the electric wires 50*b* and 50*c* with a terminal (corresponding to at least one electric wire with a terminal of the plurality of electric wires with a terminal of the present disclosure) assembled to the inner cover 60 (see FIG. 3). The first accommodating portion 41*a* and the second accommodating portion 41*b* are disposed adjacent to each other in the left-right direction so as to communicate with each other. Since the first accommodating portion 41*a* and the second accommodating portion 41*b* are spaces, there is no clear boundary therebetween.

The shape of the main body portion 41 is formed such that the electric wire 50*a* with a terminal can be accommodated in the first accommodating portion 41*a* and the electric wires 50*b* and 50*c* with a terminal assembled to the inner cover 60 can be accommodated in the second accommodating portion 41*b*. In addition, the length of the main body portion 41 in the left-right direction corresponds to the length of the side cover assembling portion 14 in the left-right direction, that is, the length from the right end portion of the right bolt accommodating portion SA to the left end portion of the left bolt accommodating portion SA. The main body portion 41 is provided with a locking portion (not illustrated) corresponding to the locked portion of the side cover assembling portion 14 of the frame 10.

A hole portion 43 penetrating in the upper-lower direction is provided at a predetermined position of the upper wall portion 42 so that a terminal 51 of the electric wire 50 with a terminal fastened to the stud bolt S can be visually recognized. In this example, the hole portion 43 is provided at a corresponding position of the upper wall portion 42 so that the terminal 51 of the electric wire 50*a* with a terminal fastened to the left stud bolt S can be visually recognized.

The frame 10, the lower cover 20, the upper cover 30, and the side cover 40 constituting the electric junction box 1 have been described above. In order to obtain the electric junction box 1 including the frame 10, the lower cover 20, the upper cover 30, and the side cover 40, it is necessary to assemble the lower cover 20, the upper cover 30, and the side cover 40 to the frame 10.

In order to assemble the lower cover 20 to the frame 10, the plurality of locking pieces 23 (see FIG. 2) of the lower cover 20 are respectively inserted into the plurality of through holes of the locked portions 12 (see FIG. 2) of the frame 10 from below, and from this state, the annular upper end edge portion of the side wall portion 21 of the lower cover 20 is fitted to the annular lower end edge portion of the side wall portion 11 of the frame 10, and the plurality of locking pieces 23 are locked to the plurality of locked portions 12. Accordingly, the assembly of the lower cover 20 to the frame 10 is completed.

In order to assemble the upper cover 30 to the frame 10, the annular lower end edge portion of the side wall portion 31 of the upper cover 30 is fitted to the annular upper end edge portion of the side wall portion 11 of the frame 10, and the plurality of locking portions 33 (see FIG. 2) of the upper cover 30 are locked to the plurality of locked portions 13 (see FIG. 2) of the frame 10. This completes the assembly of the upper cover 30 to the frame 10. The side cover 40 is assembled to the frame 10 after the upper cover 30 is assembled to the frame 10.

In order to assemble the side cover 40 to the frame 10, the plurality of locking portions (not illustrated) of the side cover 40 are locked to locked portions (not illustrated) of the side cover assembling portion 14 of the frame 10. Accordingly, the assembling of the side cover 40 to the frame 10 is completed. The side cover 40 is assembled to the frame 10 after the electric wire 50 with a terminal is fastened to the stud bolt S.

In this manner, the electric junction box 1 is completed by assembling the lower cover 20, the upper cover 30, and the side cover 40 to the frame 10. The order of the process of assembling the lower cover 20 to the frame 10 and the process of assembling the side cover 40 to the frame 10 does not matter.

In an assembled state of the electric junction box 1, the lower cover 20 is prevented from being separated downward from the frame 10 by the locking between the plurality of locking pieces 23 and the plurality of locked portions 12. Further, the upper cover 30 is prevented from being separated upward from the frame 10 by the locking between the plurality of locking portions 33 and the plurality of locked portions 13. Further, the side cover 40 is prevented from being separated forward from the frame 10 by the locking between the plurality of locking portions of the side cover 40 and the plurality of locked portions of the side cover assembling portion 14 of the frame 10.

The gutter-shaped portion 17 of the frame 10 and the gutter-shaped portion 24 of the lower cover 20 define the electric wire lead-out hole 2 on the rear left portion through which an electric wire (not illustrated) is inserted. Similarly, the gutter-shaped portion 18 of the frame 10 and the gutter-shaped portion 25 of the lower cover 20 define the electric wire lead-out hole 3 on the right front portion through which an electric wire (not illustrated) is inserted.

Electric Wire 50 with Terminal

Hereinafter, the electric wire 50 with a terminal will be described. As illustrated in FIGS. 6 and 7, the electric wire 50 with a terminal includes the substantially L-shaped terminal 51 and the electric wire 52 having an end to which the terminal 51 is connected. One end of the electric wire 50 with a terminal is connected (fastened) to the stud bolt S, and the other end thereof is connected to an external device.

The terminal 51 integrally includes an electric wire connecting portion 53 extending in the upper-lower direction and connected to the electric wire 52, and a bolt connecting portion 54 extending rearward from an upper end portion of the electric wire connecting portion 53 and fastened to the stud bolt S. The bolt connecting portion 54 is provided with a hole portion 55 which penetrates in the upper-lower direction and through which the stud bolt S is inserted. The electric wire 52 includes a conductor core wire (not illustrated) and an insulating sheath (reference numeral is omitted) that covers the conductor core wire.

Inner Cover 60

Figure 4:
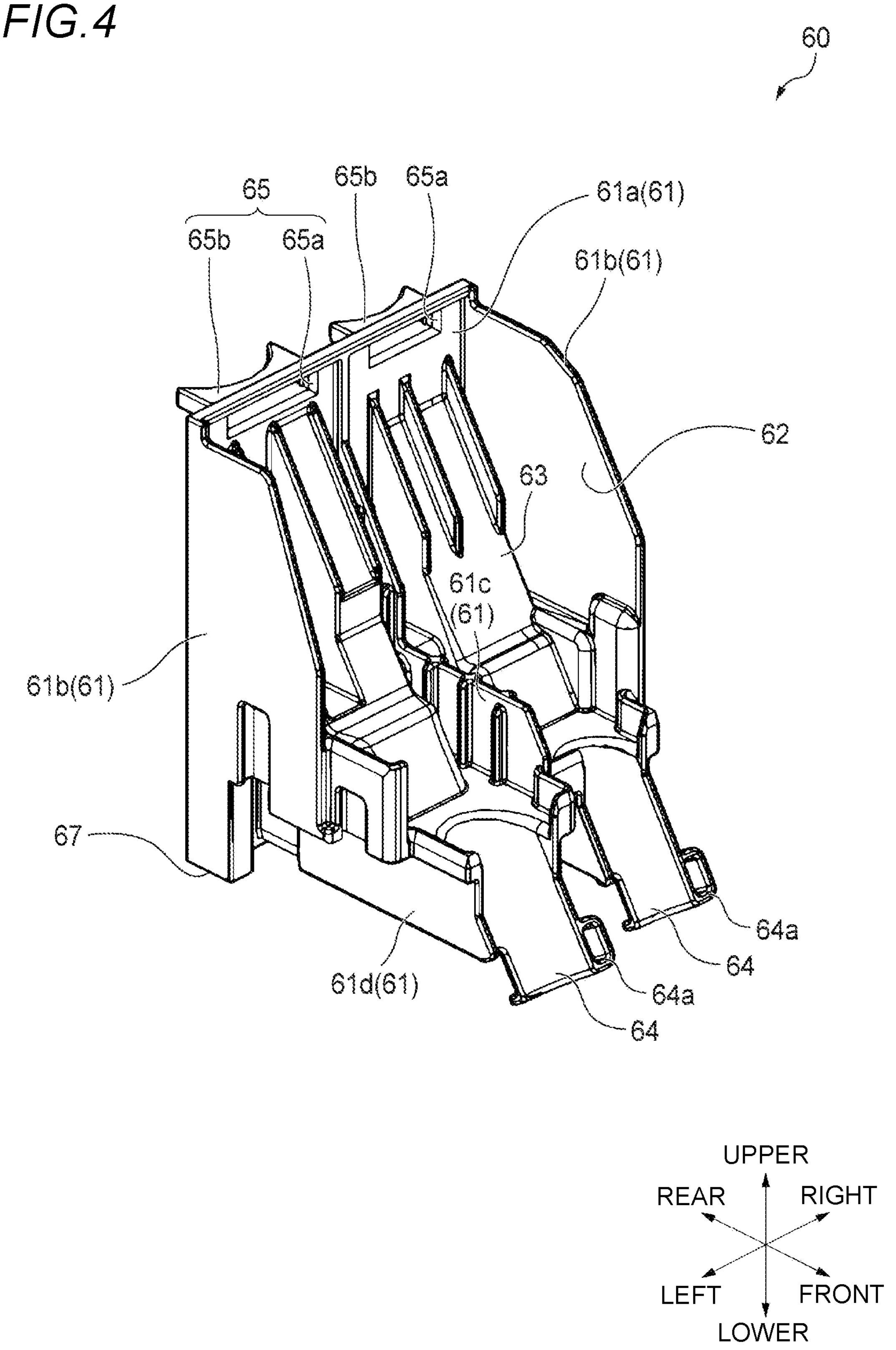
FIG. 4 is a front perspective view of an inner cover illustrated in FIG. 2.
Figure 5:
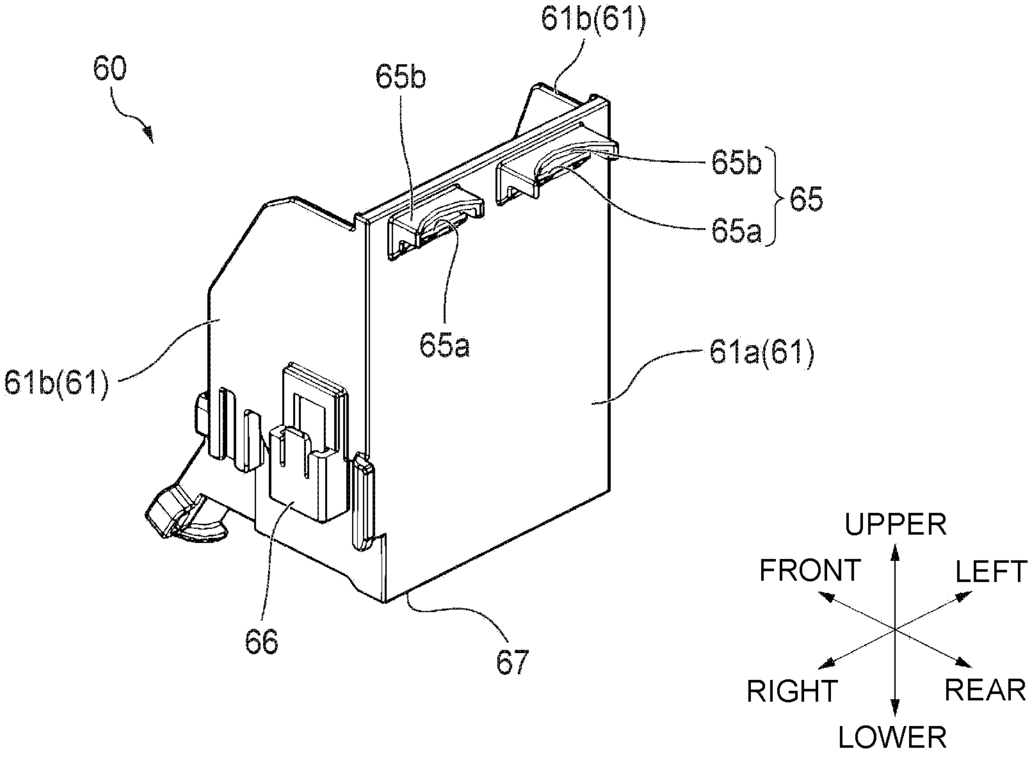
FIG. 5 is a rear perspective view of FIG. 4.

Hereinafter, the inner cover 60 will be described. As illustrated in FIGS. 4 and 5, the inner cover 60 includes a main body portion 61 in which a plurality of (two in this example) accommodating portions 62 are arranged side by side in the left-right direction. In this example, since the electric junction box 1 has three stud bolts S, the inner cover 60 (main body portion 61) is provided with two accommodating portions 62 (that is, configured to be able to hold the two electric wires 50 with a terminal) from the viewpoint of preventing an erroneous assembly.

The main body portion 61 integrally includes a first wall portion 61*a* extending in the upper-lower direction, a pair of second wall portions 61*b* provided at both end edges in the left-right direction of the first wall portion 61*a*, a partition wall portion 61*c* disposed in a substantially central area in the left-right direction between the pair of second wall portions 61*b*, and a bottom wall portion 61*d* extending forward from the first wall portion 61*a*. That is, each of the accommodating portions 62 integrally includes the first wall portion 61*a*, one of the second wall portions 61*b*, the partition wall portion 61*c*, and a part of the bottom wall portion 61*d*, and opens forward and upward.

The length of the main body portion 61 in the left-right direction (the length between the pair of second wall portions 61*b*) corresponds to the length of the inner cover assembling portion 15 in the left-right direction, that is, the length from the right end portion of the right bolt accommodating portion SA to the left end portion of the central bolt accommodating portion SA.

Each of the accommodating portions 62 is integrally provided with a guide portion 63 that guides a lead-out direction of the electric wire 50 with a terminal. The guide portion 63 is formed in an inclined shape such that a front end surface thereof extends obliquely toward a lower front portion.

A semi-cylindrical electric wire holding portion 64 that opens forward is provided at a lower end portion of each of the accommodating portions 62 so as to extend obliquely toward the lower front portion. Accordingly, the electric wire 52 is led out from the side cover 40 to the lower front portion. The electric wire holding portion 64 has a function of holding a part of the electric wire 52 in the electric wire 50 with a terminal.

An electric wire fixing portion 64*a* including a hole portion penetrating in the front-rear direction is provided at a right end portion of the electric wire holding portion 64. A band B for fixing the electric wire 52 to the electric wire holding portion 64 (see FIGS. 6 and 7) is inserted into the electric wire fixing portion 64*a*.

Terminal holding portions 65 are respectively provided at the upper end portion of the main body portion 61 so as to correspond to the accommodating portions 62. The terminal holding portion 65 includes a hole portion 65*a* penetrating in the front-rear direction and a hood portion 65*b* protruding rearward from a rear end surface of the first wall portion 61*a* over the entire peripheral area of the hole portion 65*a*. In the terminal holding portion 65, the bolt connecting portion 54 of the terminal 51 of the electric wire 50 with a terminal is, for example, press-fitted into the hole portion 65*a* from the front, and the press-fitted bolt connecting portion 54 is held by the hood portion 65*b*.

On the outer surface of the main body portion 61 (in this example, the right second wall portion 61*b*), a locked portion 66 including a through hole extending in the upper-lower direction is integrally provided corresponding to a locking piece of the frame 10 (see FIG. 5).

Erroneous Assembly Prevention Structure of Electric Wire 50 with Terminal

Hereinafter, an erroneous assembly prevention structure of the electric wire 50 with a terminal will be described. Before describing the erroneous assembly prevention structure of the electric wire 50 with a terminal, the assembly of the electric wires 50*b* and 50*c* with a terminal to the inner cover 60 will be described. In assembling the electric wires 50*b* and 50*c* with a terminal to the inner cover 60, the bolt connecting portions 54 of the electric wires 50*b* and 50*c* with a terminal are press-fitted into the respective hole portions 65*a* of the terminal holding portions 65 in the inner cover 60, and the electric wires 52 of the electric wires 50*b* and 50*c* with a terminal are held by the respective electric wire holding portions 64. Accordingly, the electric wires 50*b* and 50*c* with a terminal are assembled to the inner cover 60 (see FIGS. 2 and 6 to 7).

Hereinafter, the erroneous assembly prevention structure of the electric wire 50 with a terminal will be described separately for a case where the electric wire 50*a* with a terminal is first assembled (fastened) to the stud bolt S and a case where the electric wires 50*b* and 50*c* with a terminal assembled to the inner cover 60 are first assembled (fastened) to the stud bolt S. The electric wire 50*a* with a terminal is fastened to the left stud bolt S, the electric wire 50*b* with a terminal is fastened to the central stud bolt S, and the electric wire 50*c* with a terminal is fastened to the right stud bolt S. A mode in which the electric wires 50 with a terminal are disposed so as to be fastened to the corresponding stud bolts S as described above indicates a "normal position" of the present disclosure.

First, an erroneous assembly prevention structure of the electric wire 50 with a terminal when the electric wire 50*a* with a terminal is first assembled (fastened) to the stud bolt S will be described. As illustrated in FIG. 6, when the electric wire 50*a* with a terminal is first assembled to the stud bolt S, the electric wires 50*b* and 50*c* with a terminal assembled to the inner cover 60 are necessarily assembled and fastened to the central and right stud bolts S, respectively. However, when the electric wires 50*b* and 50*c* with a terminal are erroneously disposed so as to be assembled to the left and central stud bolts S, respectively, and the assembly is started so that the stud bolts S are inserted into the hole portions 55 of the electric wires 50 with a terminal, the electric wire 50*a* with a terminal interferes with a lower end portion 67 of the inner cover 60 in the middle of the assembly, and accordingly the hole portions 55 of the electric wires 50 with a terminal are not inserted into the erroneous stud bolts S. As a result, the erroneous assembly of the electric wires 50*b* and 50*c* with a terminal is prevented.

Next, an erroneous assembly prevention structure of the electric wire 50 with a terminal when the electric wires 50*b* and 50*c* with a terminal assembled to the inner cover 60 are first assembled (fastened) to the stud bolts S will be described. As described above, when the electric wires 50*b* and 50*c* with a terminal are erroneously disposed so as to be assembled to the left and central stud bolts S, respectively, and the assembly is started so that the stud bolts S are inserted into the hole portions 55 of the electric wires 50 with a terminal, the electric wire holding portion 16 interferes with the lower end portion 67 of the inner cover 60 in the middle of the assembly, and accordingly the hole portions 55 of the electric wires 50 with a terminal are not inserted into the erroneous stud bolts S. As a result, the erroneous assembly of the electric wires 50*b* and 50*c* with a terminal is prevented.

A method for manufacturing the electric junction box unit 100 is completed by assembling the side cover 40 to the frame 10 as described above after each electric wire 50 with a terminal is fastened to the corresponding stud bolt S.

Operation and Effect

According to the electric junction box unit 100 of the present embodiment, among the plurality of electric wires 50*a*, 50*b*, and 50*c* with a terminal fastened to the corresponding stud bolts S among the plurality of stud bolts S, the electric wires 50*b* and 50*c* with a terminal are assembled to the inner cover 60. Further, by disposing the electric wire 50 with a terminal assembled to the inner cover 60 at a position different from the normal position, at least a part (the main body portion 61 and the lower end portion 67) of the inner cover 60 interferes with the electric wire holding portion 16 (interference portion) provided in the frame 10.

Accordingly, the electric wire 50 with a terminal (in this example, 50*b* and 50*c*) is prevented from being fastened to the stud bolt S different from the corresponding stud bolt S. That is, in the electric junction box unit 100, the erroneous assembly of the electric wire 50 with a terminal is prevented.

According to the electric junction box unit 100 of the present embodiment, the interference portion (the electric wire holding portion 16) has a function of holding the electric wire 52 of the other electric wire 50*a* with a terminal fastened to the stud bolt S in addition to the erroneous assembly prevention function. As a result, it is possible to prevent the electric wire 50*a* with a terminal from moving inside the side cover 40.

Other Embodiments

The present disclosure is not limited to the embodiment described above, and modifications, improvements, and the like can be made as appropriate. In addition, materials, shapes, dimensions, numbers, arrangement positions, and the like of the respective constituent elements in the embodiment described above are freely selected and are not limited as long as the present disclosure can be implemented.

First Modification of Inner Cover 60

In the above embodiment, since the plurality of electric wires 50 with a terminal are respectively fastened to all of the three stud bolts S, two accommodating portions 62 are provided in the inner cover 60. However, for example, when only two stud bolts S among the three stud bolts S are used, only one accommodating portion 62 may be provided in the inner cover 60, and a dummy portion 68 having a length in the left-right direction substantially equal to that of the accommodating portion 62 may be provided instead of the other accommodating portion 62 (see FIG. 8). This can prevent the electric wire 50 with a terminal from being assembled (fastened) to the stud bolt S that is not used.

Second Modification of Inner Cover 60

In the above embodiment, the inner cover 60 is configured to correspond to the right and central stud bolts S. However, the inner cover 60 may be configured to correspond to all the stud bolts S including the left stud bolt S. Specifically, only an upper area of a left front portion of the inner cover 60 may be provided with a protruding accommodating portion 69 protruding leftward by a length of the bolt accommodating portion SA in the left-right direction (see FIG. 9). Therefore, the length of the inner cover assembling portion 15 in the left-right direction is equal to the length of the side cover assembling portion 14 in the left-right direction. That is, since the length of the inner cover 60 in the left-right direction is equal to the length of the side cover assembling portion 14 in the left-right direction, the inner cover 60 is reliably positioned with respect to the frame 10 (the inner cover assembling portion 15). This prevents an erroneous assembly of the electric wire 50 with a terminal. A length of the protruding accommodating portion 69 in the upper-lower direction is not particularly limited as long as the protruding accommodating portion 69 does not interfere with the electric wire holding portion 16 at the normal position.

Third Modification of Inner Cover 60 and First Modification of Side Cover 40

In the above embodiment, each of the accommodating portions 62 of the inner cover 60 is provided with the guide portion 63 whose front end surface is formed in an inclined shape so as to extend obliquely toward the lower front portion, and the electric wire holding portion 64 is provided so as to extend obliquely toward the lower front portion. Therefore, the electric wire 52 of the electric wire 50 with a terminal is led out from the side cover 40 to the lower front portion. However, for example, when it is desired to lead the electric wire 52 of the electric wire 50 with a terminal downward from the side cover 40 along the upper-lower direction, the guide portion 63 may not be provided in each accommodating portion 62, and the electric wire holding portion 64 may be provided to extend (downward) along the upper-lower direction (see FIG. 10). In this way, the inner cover 60 can be aligned with the direction in which the electric wire 52 is to be led out. Accordingly, the electric wire 52 can be led out in a desired direction.

In the above embodiment, since the electric wire 52 of the electric wire 50 with a terminal assembled to the inner cover 60 is obliquely led out to the lower front portion, the side cover 40 is formed to correspond thereto. However, when the inner cover 60 is configured as in a third modification, since the electric wire 50 with a terminal assembled to the inner cover 60 is led out downward, the side cover 40 may be formed to have a small length in the front-rear direction of the main body portion 41 so as to correspond thereto (see FIG. 11). Accordingly, the side cover 40 and thus the electric junction box unit 100 can be reduced in size.

Here, aspects of the embodiments of the electric junction box unit of the present disclosure as mentioned above are summarized and listed below.

According to an aspect 1 of the present disclosure, an electric junction box unit (100) includes: an electric junction box (1) having a plurality of stud bolts (S); a plurality of electric wire with terminals (50: 50*a*, 50*b*, 50*c*) each including a terminal (51) and an electric wire (52) and fastened to a corresponding one (S) of the plurality of stud bolts (S); and a cover (inner cover 60) to which at least one (50*b*, 50*c*) of the plurality of electric wire with terminals (50) is assembled. The electric junction box (1) includes an interference portion (electric wire holding portion 16) that interferes with at least a part of the cover when the electric wire with terminals (50*b*, 50*c*) assembled to the cover (inner cover 60) are disposed at a position different from a normal position where one of the electric wire with terminals is fastened to the corresponding stud bolt (S).

According to the electric junction box unit having the above aspect 1, at least one electric wire with a terminal among the plurality of electric wires with a terminal fastened to the corresponding stud bolts among the plurality of stud bolts is assembled to the cover. The electric wire with a terminal assembled to the cover is disposed at a position different from the normal position, so that at least a part of the cover interferes with the interference portion of the electric junction box. This prevents the electric wire with a terminal from being fastened to a stud bolt different from the corresponding stud bolt. That is, in the electric junction box unit according to the present configuration, an erroneous assembly of the electric wire with a terminal is prevented.

According to an aspect 2 of the present disclosure, the interference portion is an electric wire holding portion (16) that holds an electric wire (52) of another electric wire with terminal (50*a*) different from the electric wire with terminals (50*b*, 50*c*) assembled to the cover (inner cover 60).

According to the electric junction box unit having the above aspect 2, the interference portion has a function of holding an electric wire of another electric wire with a terminal fastened to the stud bolt in addition to an erroneous assembly prevention function.

An electric junction box unit according to the present disclosure will be described below. According to the electric junction box unit of the present configuration, at least one electric wire with a terminal among the plurality of electric wires with a terminal fastened to the corresponding stud bolts among the plurality of stud bolts is assembled to the cover. The electric wire with a terminal assembled to the cover is disposed at a position different from the normal position, so that at least a part of the cover interferes with the interference portion of the electric junction box. This prevents the electric wire with a terminal from being fastened to a stud bolt different from the corresponding stud bolt. That is, in the electric junction box unit according to the present configuration, an erroneous assembly of the electric wire with a terminal is prevented.

What is claimed is:

1. An electric junction box unit comprising:

an electric junction box having a a frame, a first stud bolt contained within the frame, a second stud bolt contained within the frame and arranged side by side with the first stud bolt, and a lid configured to cover the first stud bolt and the second stud bolt when the lid is mounted onto the frame;

a first electric wire with terminal including a first terminal and a first electric wire and configured to be fastened to the first stud bolt;

a second electric wire with terminal including a second terminal and a second electric wire and configured to be fastened to the second stud bolt; and a cover to which the second electric wire with terminal is assembled, wherein the electric junction box includes an interference portion that interferes with at least a part of the cover when the second electric wire with terminal assembled to the cover is disposed at a position that aligns the second terminal with the first stud bolt and the first electric wire with terminal is fastened to the first stud bolt.

2. The electric junction box unit according to claim 1, wherein the interference portion is an electric wire holding portion that is configured to hold the first electric wire when the first electric wire with terminal is fastened to the first stud bolt, the electric wire holding portion interferes with the cover when the cover is disposed at the position and the first electric wire with terminal is unattached to the first stud bolt.

3. The electric junction box unit according to claim 1, further comprising:

a third stud bolt contained within the frame and arranged side by side with the first stud bolt and the second stud bolt; and a third electric wire with terminal including a third terminal and a third electric wire and configured to be fastened to the third stud bolt, the electric wire with terminal is assembled to the cover and is adjacent to the second electric wire with terminal.

* * * * *